United States Patent
Rimmington

(10) Patent No.: US 10,087,754 B2
(45) Date of Patent: Oct. 2, 2018

(54) LONGWALL SYSTEM FACE ALIGNMENT DETECTION AND STEERING

(71) Applicant: Joy MM Delaware, Inc., Wilmington, DE (US)

(72) Inventor: Gareth Rimmington, South Yorks (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/080,344

(22) Filed: Mar. 24, 2016

(65) Prior Publication Data

US 2017/0275993 A1 Sep. 28, 2017

(51) Int. Cl.
*E21C 35/08* (2006.01)
*E21C 35/24* (2006.01)
(Continued)

(52) U.S. Cl.
CPC .............. *E21C 35/24* (2013.01); *E21C 25/10* (2013.01); *E21C 27/02* (2013.01); *E21C 35/08* (2013.01);
(Continued)

(58) Field of Classification Search
CPC ..... E21D 23/14; E21D 23/142; E21D 23/144; E21D 23/148; E21D 23/12; E21C 35/08; E21C 35/12; E21C 35/14; E21C 35/24
(Continued)

(56) References Cited

U.S. PATENT DOCUMENTS

| 4,093,309 A | 6/1978 | Mullins |
| 4,111,487 A * | 9/1978 | Mullins .................. E21C 25/06 |
| | | 299/1.6 |

(Continued)

FOREIGN PATENT DOCUMENTS

| CA | 1229875 | 12/1987 |
| CN | 1818346 | 8/2006 |

(Continued)

OTHER PUBLICATIONS

Hargrave, C. O. et al., "Radar Level Sensor for Longwall Creep and Retreat Measurement", CSIRO Mining Automation, Queensland Centre for Advanced Technologies, 2007, pp. 2102-2109, Department of Computer Science and Electrical Engineering, The University of Queen Island, Brisbane, Australia.

(Continued)

*Primary Examiner* — David J Bagnell
*Assistant Examiner* — Michael A Goodwin
(74) *Attorney, Agent, or Firm* — Michael Best & Friedrich LLP

(57) ABSTRACT

Systems and methods are provided for detecting face alignment and face steering of a longwall mining system. The system includes a detection device mounted in a maingate roadway and a first indicator device mounted on a shearer of the longwall mining system to indicate a position of the shearer to the detection device. The system further includes a controller coupled to the detection device. The controller determines a shearer path of the shearer as the shearer moves along an ore face. The shearer path is determined based on a signal from the first indicator device received by the detection device. The controller generates an indication of face alignment based on the shearer path.

17 Claims, 7 Drawing Sheets

(51) Int. Cl.
    *E21D 23/12*     (2006.01)
    *E21C 25/10*     (2006.01)
    *E21C 27/02*     (2006.01)
    *E21D 23/00*     (2006.01)
    *E21F 13/06*     (2006.01)
    *G01B 7/31*     (2006.01)
    *E21C 35/12*     (2006.01)
    *E21D 23/14*     (2006.01)

(52) U.S. Cl.
    CPC .......... *E21C 35/12* (2013.01); *E21D 23/0004* (2013.01); *E21D 23/12* (2013.01); *E21D 23/14* (2013.01); *E21F 13/06* (2013.01); *G01B 7/31* (2013.01)

(58) Field of Classification Search
    USPC .................................................... 299/1.6, 1.7
    See application file for complete search history.

(56) References Cited

U.S. PATENT DOCUMENTS

| | | | |
|---|---|---|---|
| 4,206,840 A | 6/1980 | Hanson | |
| 4,355,895 A | 10/1982 | Cairns et al. | |
| 4,453,846 A | 6/1984 | Mullins et al. | |
| 4,466,667 A * | 8/1984 | Poulsen | E21C 35/08 175/45 |
| 5,020,860 A * | 6/1991 | Bessinger | E21C 35/08 299/1.6 |
| 5,145,235 A | 9/1992 | Smart | |
| 5,368,369 A | 11/1994 | Maity | |
| 6,481,802 B1 | 11/2002 | Kussel | |
| 6,857,705 B2 * | 2/2005 | Hainsworth | E21C 35/08 299/1.6 |
| 7,494,190 B2 | 2/2009 | Kussel | |
| 8,157,330 B2 | 4/2012 | Niederriter | |
| 8,240,773 B2 | 8/2012 | Hargrave et al. | |
| 8,523,287 B2 | 9/2013 | Bowles | |
| 8,708,421 B2 | 4/2014 | Junker et al. | |
| 8,777,325 B2 * | 7/2014 | Wesselmann | E21C 35/24 299/1.7 |
| 2009/0134692 A1 | 5/2009 | Hargrave | |
| 2010/0276258 A1 | 11/2010 | Bremhorst | |
| 2012/0091782 A1 | 4/2012 | Wesselmann et al. | |
| 2012/0098325 A1 | 4/2012 | Junker et al. | |
| 2013/0015043 A1 | 1/2013 | Tout | |
| 2013/0269453 A1 | 10/2013 | Morrison | |
| 2015/0061350 A1 | 3/2015 | Paterson | |
| 2015/0097411 A1 | 4/2015 | Bowles | |
| 2016/0061035 A1 * | 3/2016 | Siegrist | E21F 17/18 340/686.1 |
| 2017/0226853 A1 * | 8/2017 | Katrycz | E21C 35/24 |

FOREIGN PATENT DOCUMENTS

| | | | | |
|---|---|---|---|---|
| CN | 102353962 | | 2/2012 | |
| CN | 104612682 A | * | 5/2015 | ............ E21C 35/08 |
| GB | 1558154 A | | 12/1979 | |
| GB | 2198606 A | | 6/1988 | |
| PL | 192046 | | 8/2006 | |
| PL | 220815 | | 1/2016 | |
| WO | 03058031 A1 | | 7/2003 | |
| WO | 2012031610 A1 | | 3/2012 | |

OTHER PUBLICATIONS

Hargrave, C., "Radar Waypoint Navigator for Underground Mining", Antennas and Propagation (EuCAP), 2014 8th European Conference, Apr. 6-11, 2014, pp. 3587-3591, IEEE, Brisbane, QLD, Australia.

Polish Search Report and Written Opnion for Application No. P.420927 dated Oct. 17, 2017 (8 pages with English translation included).

U.S. Office Action for U.S. Appl. No. 15/080,322 dated Oct. 2, 2017 (12 pages).

UK Search Report for Application # GB1704648.3 dated Sep. 22, 2017 (3pages).

UK Search Report for Application # GB1704649.3 dated Sep. 22, 2017 (3pages).

Polish Search Report and Written Opnion for Application No. P.420919 dated Oct. 16, 2017 (3 pages with English translation included).

* cited by examiner

LONGWALL SYSTEM FACE ALIGNMENT DETECTION AND STEERING

RELATED APPLICATION

The present application is related to co-filed U.S. patent application Ser. No. 15/080,322, the entire contents of which are incorporated herein by reference.

FIELD OF THE INVENTION

The present invention relates to methods and systems for detecting movement of a conveyor system used in underground mining environments.

BACKGROUND

Longwall mining systems are used to mine a block of coal or other ore called a longwall block. The longwall block includes a coal face (or ore face) from which coal (or ore) is removed. Two roadways, a maingate roadway and a tailgate roadway, run along the sides of the longwall block and orthogonal to the ore face. The longwall mining system includes powered roof supports to support a roof and overlying rock above the longwall system. A longwall shearer moves along the ore face of the longwall block, shearing ore from the ore face and onto an armored face conveyor (AFC). The armored face conveyor extends along the ore face and transports ore towards the maingate roadway. When ore has been hauled to the maingate roadway, a beam stage loader (BSL) connected to the armored face conveyor transfers the ore from the armored face conveyor, through a turn (e.g., of 90 degrees), and onto a belt conveyor positioned along the maingate roadway. After the longwall shearer shears off a layer of the ore face, the longwall system moves forward to shear the next layer. Due to the mining environment and other factors, the ore face may become uneven and the armored face conveyor along which the shearer travels may become misaligned with the ore face.

SUMMARY

In one embodiment, the invention provides a system for detecting face alignment and face steering of a longwall mining system. The system includes a detection device mounted in a maingate roadway; a first indicator device mounted on a shearer of the longwall mining system to indicate a position of the shearer to the detection device; and a controller coupled to the detection device. The controller determines a shearer path of the shearer as the shearer moves along an ore face. The shearer path is determined based on a signal from the first indicator device received by the detection device. The controller further generates an indication of face alignment based on the shearer path.

In another embodiment, the invention provides a method for detecting face alignment and face steering of a longwall mining system. The method includes receiving, by a detection device, a signal from a first indicator device on a shearer that is indicative of a position of the shearer of the longwall mining system. The method further includes determining, by a controller coupled to the detection device, a shearer path of the shearer along an ore face. The shearer path is determined based on the signal received by the detection device. The method also includes generating, by the controller, an indication of face alignment based on the shearer path.

In another embodiment, the invention provides a controller for detecting face alignment and face steering of a longwall mining system. The controller includes an electronic processor and executable instructions stored in a memory configured to determine a shearer path of a shearer along an ore face. The shearer path is determined based on a signal, from a first indicator device on the shearer, that is received by a detection device coupled to the controller and located in the maingate roadway. The controller further includes executable instructions stored in a memory configured to generate an indication of face alignment based on the shearer path.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

In the following description, numerous specific details are set forth to provide a thorough understanding of the present invention. However, it will be apparent to one of skill in the art that the present invention may be practiced without one or more of these specific details. In other instances, well-known features have not been described in order to avoid obscuring the present invention.

Figure 1:
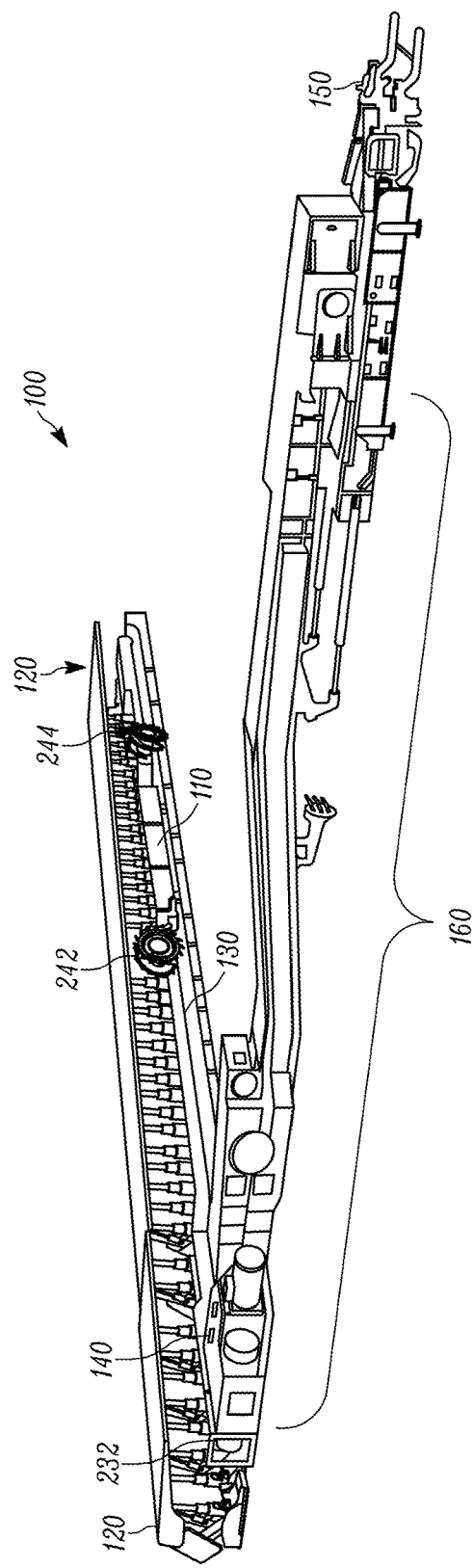
FIG. 1 is a perspective view of a longwall mining system, according to one embodiment of the invention.
Figure 2:
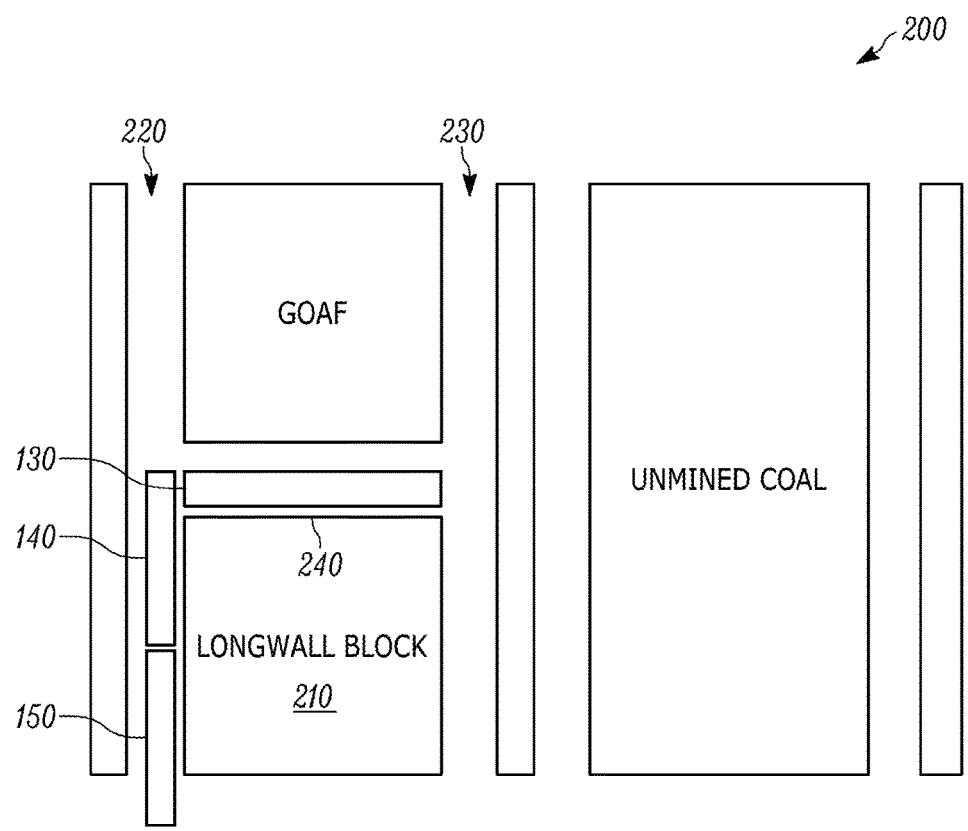
FIG. 2 illustrates an example of an underground mine in which the longwall mining system of FIG. 1 may be operated.

FIG. 1 illustrates a longwall mining system 100. In the example illustrated, the longwall mining system 100 includes, without limitation, a longwall shearer 110, powered roof supports 120, an armored face conveyor 130, a beam stage loader 140, a belt conveyor 150, and a monorail system 160. The longwall mining system 100 is used to mine a block of ore (e.g., coal) called a longwall block of an underground mine, such as an underground mine 200 shown in FIG. 2. As shown, the underground mine 200 includes a longwall block 210, a maingate roadway 220, and a tailgate roadway 230. The longwall block 210 includes an ore face 240 from which ore is removed. The two roadways, the maingate roadway 220 and the tailgate roadway 230, run along the sides of the longwall block 210 and orthogonal to the ore face 240.

Returning to FIG. 1, the longwall shearer 110 cuts ore from the ore face 240 of the longwall block 210. The longwall shearer 110 is located above the armored face conveyor 130 and cuts ore as it moves along the length of the ore face 240. In some embodiments, the longwall shearer 110 may be mounted on the armored face conveyor 130. The longwall shearer 110 may include one or more cutting drums 242 and 244. The cutting drums 242 and 244 are laced with cutting picks and rotate in a plane parallel to the ore face 240. When pushed into the ore face 240 and rotated, the cutting drums 242 and 244 cut into the ore face 240.

Once the ore is cut from the ore face 240, the ore falls onto the armored face conveyor 130, which transports the ore to a maingate end 232 of the armored face conveyor 130 at the maingate roadway 220. The armored face conveyor 130 extends along the length of the ore face 240 from the tailgate roadway 230 to the maingate roadway 220. The armored face conveyor 130 may include a series of steel pans able to move relative to each other by flexing. In some embodiments, ore is conveyed by steel bars of the armored face conveyor 130 arranged at 90 degrees to the length of the armored face conveyor 130, which are dragged along by a pair of circular chains.

At the maingate end 232 of the armored face conveyor 130, the ore is transferred to the beam stage loader 140. The beam stage loader 140 is located along the maingate roadway 220 extending along the rib or wall of the longwall block 210 from the maingate end 232 of the armored face conveyor 130 to the belt conveyor 150. In some embodiments, the beam stage loader 140 may have a flexible portion closer to the armored face conveyor 130 in order to transfer the ore through a turn (e.g., of 90 degrees) at the maingate end 232 of the armored face conveyor 130. In certain embodiments, the beam stage loader 140 may have a change of elevation along its length in order to discharge ore onto the belt conveyor 150. In some embodiments, the beam stage loader 140 may also include a crusher or breaker in order to prevent damage and to improve loading onto the belt conveyor 150. In some embodiments, similar to the armored face conveyor 130, ore is conveyed by steel bars of the beam stage loader 140, arranged at 90 degrees to the length of the beam stage loader 140, which are dragged along by a pair of circular chains. The beam stage loader 140 may be attached to a maingate drive and may be moved along the maingate roadway 220 or laterally within the maingate roadway 220. The belt conveyor 150 receives ore from the beam stage loader 140 and transports ore to the surface. The belt conveyor 150 may extend from the end of beam stage loader 140 to the surface.

The powered roof supports 120 support the roof of the underground mine 200 and advance the armored face conveyor 130 during the mining operation. The powered roof supports 120 are located along the ore face 240 providing support to the roof above the armored face conveyor 130 and the longwall shearer 110. In some embodiments, the powered roof supports 120 include a canopy and vertical and horizontal hydraulic cylinders. The canopy may be pressed against the roof by the vertical cylinders in order to support the roof during the mining operation, while the horizontal cylinders may be used to advance the powered roof supports 120 and the armored face conveyor 130 in a direction of retreat of the longwall block 210 (i.e., downward in FIG. 2).

The monorail system 160 supports certain maingate equipment used by the longwall mining system. For example, the monorail system 160 supports high pressure water and hydraulic hoses that are used to cool down the longwall shearer 110 during the mining process. The monorail system 160 also carries the power control and communications cables for the operation of the longwall mining system 100.

Although, in the above description, the longwall mining system 100 is shown with a specific arrangement of all the components, persons skilled in the art will recognize that the arrangement in FIG. 1 contemplates only an exemplary embodiment of the present invention. Other embodiments, may include more or less components arranged differently than shown and may perform additional functions than those described herein.

When one layer of the longwall block 210 is mined, the longwall mining system 100 retreats in the direction of the ore face 240 in order to mine the next, newly exposed layer of the longwall block 210.

Figure 3:
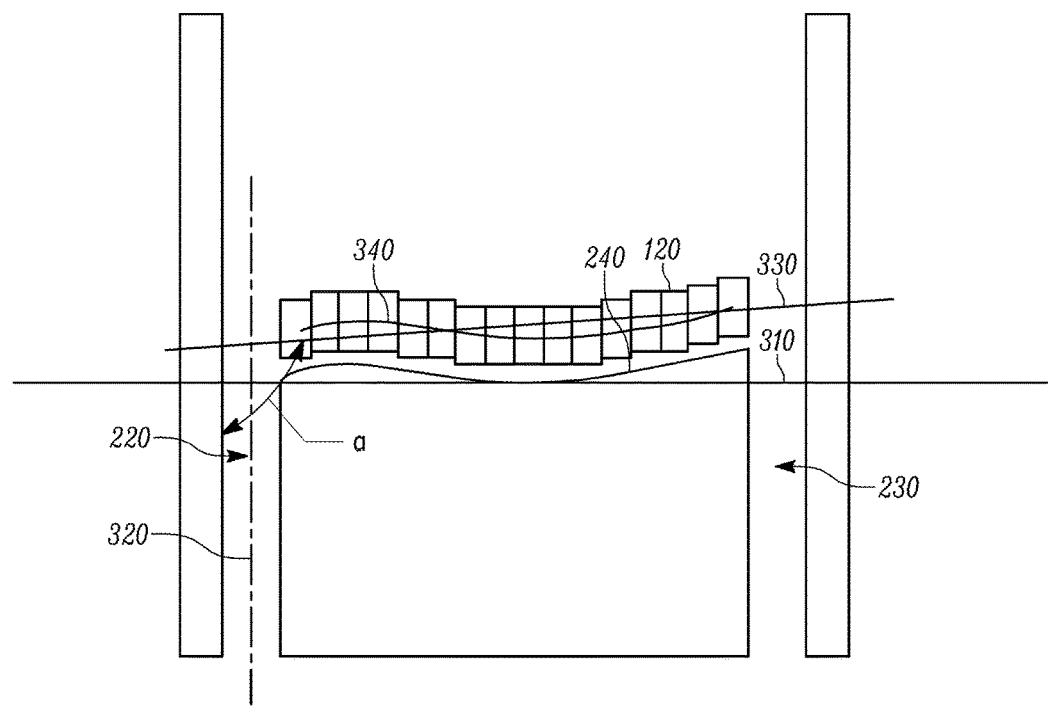
FIG. 3 illustrates face alignment of a longwall mining system.

Each newly exposed layer of the longwall block 210 may not be even. For example, as shown in FIG. 3, the ore face 240 curves inward and outward, rather than following a straight line, such as a desired alignment line 310. The desired alignment line 310 is illustrated as perpendicular to the maingate roadway 220 and the tailgate roadway 230. However, in some embodiments, the desired alignment line 310 may not be perpendicular to the maingate roadway 220 or the tailgate roadway 230. The armored face conveyor 130 and the powered roof supports 120, generally, follow the contour of the ore face 240. Determining the face alignment of the ore face 240 will help in automating and steering the longwall mining system 100 along the ore face 240. As described in more detail below, face alignment is a general measure of the relative positions of the powered roof supports 120 in relation to a straight line theoretically drawn from the maingate roadway 220 to the tailgate roadway 230 and perpendicular to the direction of the maingate roadway 220, the tailgate roadway 230, or both.

Figure 4:
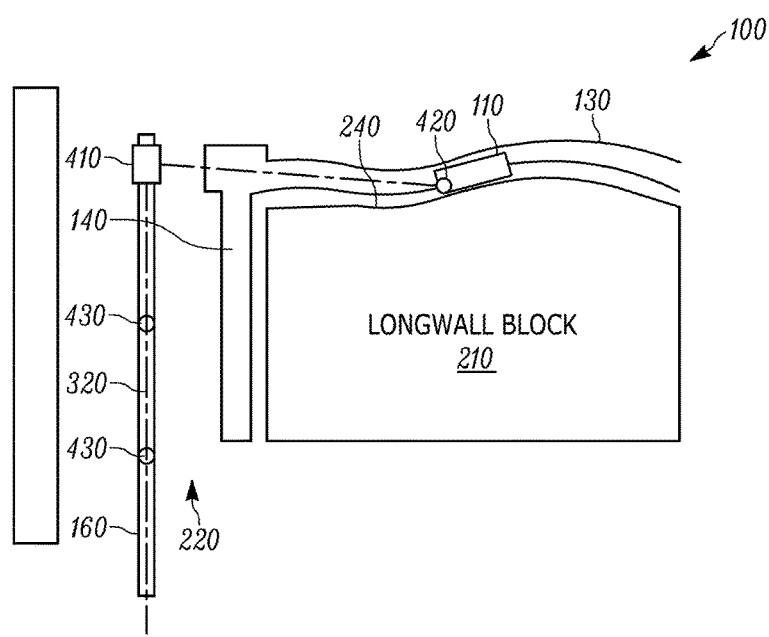
FIG. 4 illustrates a detection system used with the longwall mining system of FIG. 1 configured to implement one or more aspects of the present invention.

FIG. 4 illustrates the longwall mining system 100 of FIG. 1 including detection components used to determine face alignment of the ore face 240. In the example illustrated, the detection components includes a detection device 410, a corner indicator device 420 and maingate indicator devices 430.

The detection device 410 detects the position of the longwall shearer 110 as it moves along the ore face 240. The detection device 410 may be mounted on maingate equipment (for example, on the monorail system 160). The maingate equipment may be configured to move the detection device 410 along the maingate roadway 220 as the longwall mining system 100 advances such that the detection device 410 maintains a clear line of sight to the longwall shearer 110. In some embodiments, the detection device 410 may be located at other locations in the maingate roadway 220. The detection device 410 may include a radio detection and ranging (RADAR) device, a light radar (LIDAR) device, a sound navigation and ranging (SONAR) device or other known electronic measuring device capable of sensing angle and distance and/or spatial coordinates of an object.

The corner indicator device 420 (e.g., a first indicator device) indicates a position of the longwall shearer 110 to the detection device 410. The corner indicator device 420 may be mounted on the longwall shearer 110 such that it has a clear line of sight to the detection device 410. For example, the corner indicator device 420 may be mounted on a maingate side of the longwall shearer 110 as shown in FIG. 4. In some embodiments, the corner indicator device 420 may be mounted on other locations of the longwall shearer 110.

One or more of the maingate indicator devices 430 (e.g., a second indicator device) indicates a position of the maingate roadway 220 to the detection device 410. In particular, each of the maingate indicator devices 430 indicates a location of a maingate line. To simplify the description, one of the maingate indicator devices 430 will be described and such description will be representative for each of the maingate indicator devices 430. The maingate line extends in a direction of the maingate roadway 220. For example, the maingate line is a centerline of the maingate roadway 220 (a maingate centerline 320), a centerline of the monorail system 160, or a line along a wall face on either side of the maingate centerline 320 that defines the maingate roadway 220. In some embodiments, the monorail centerline coincides with the maingate centerline 320. The maingate indicator device 430 may be mounted on the monorail system 160 or another location in the maingate roadway 220 to indicate the position of the maingate line. When the maingate indicator device 430 is not positioned on the maingate line, the detection device 410 may determine the position of the maingate line using a predetermined offset indicative of the offset of the maingate indicator device 430 from the maingate line. To simplify the discussion, the maingate centerline 320 is generally described and used as the maingate line herein for determining face alignment. However, in some embodiments, the maingate line used for determining face alignment may be offset from the maingate centerline 320. In some embodiments, the detection device 410 is positioned on the maingate centerline 320 and oriented at a setup stage such that the maingate centerline 320 is known to the detection device 410 without communicating with the maingate indicator device 430, which may not be present in the system in such embodiments.

The signals received from the indicator devices 420 and 430 may be, for example, a periodic signal generated by the indicator device, may be generated by the indicator device in response to a command from the controller 500 (e.g., sent over a wired or wireless connection), or may be a reflection of a signal transmitted by the detection device 410. For example, in some embodiments, the detection device 410 includes a transmitter to transmit radio, light, or sound signals towards the indicator devices 420 and 430. The indicator devices 420 and 430 include reflectors that reflect the signals from the detection device 410. Alternatively, the indicator devices 420 and 430 may include beacons that transmit radio, light or sound signals towards the detection device 410. The detection device 410 also includes a receiver to receive reflected or transmitted signals from the indicator devices 420 and 430. In some embodiments, only one of the indicator devices 420 and 430 may be used to determine the face alignment of the ore face 240 and to steer the longwall mining system 100. Further, in some embodiments, the detection device 410 may include multiple receivers mounted at different locations to receive position data from the indicator devices 420 and 430. In other embodiments, more indicator devices than illustrated in FIG. 4 may be used to determine face alignment of the ore face 240 and to steer the longwall mining system 100. Therefore, the number and position of the receiver and indicator devices are exemplary should not be considered limiting.

Figure 5:
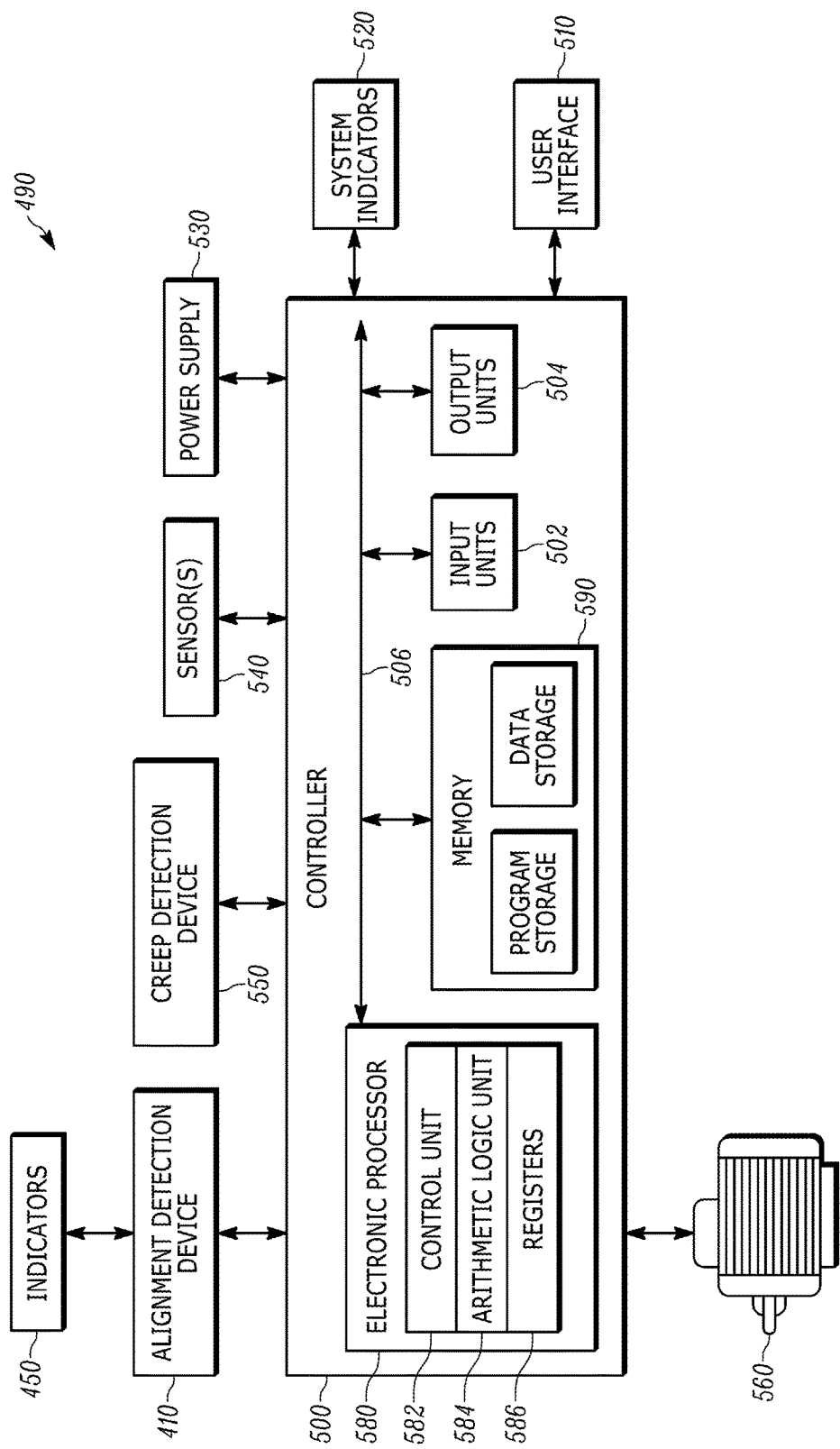
FIG. 5 illustrates a controller for the longwall mining system of FIG. 1 according to one embodiment of the invention.

FIG. 5 illustrates a control system 490 associated with the longwall mining system 100. The control system 490 includes a controller 500 coupled (e.g., electrically or communicatively) to a variety of additional modules or components, such as a user interface 510, one or more system indicators 520, a power supply 530, one or more sensors 540, a creep detection device 550, the alignment detection device 410, and a roof support drive mechanism and drive 560.

The one or more sensors 540 are, for example, sensors configured or operable to measure or sense a characteristic of the longwall shearer 110 (e.g., a shearer position, a shearer speed, etc.), sensors configured or operable to measure or sense a characteristic of the conveyors, such as the armored face conveyor 130, the beam stage loader 140 and the belt conveyor 150 (e.g., a chain position, a chain speed, a chain tension, etc.), power transducers within the longwall mining system 100 configured or operable to measure or sense an electrical characteristic (e.g., current, voltage, power factor, torque, speed, input power, output power, etc.), load cells or sensors (e.g., tension sensors, load pins, etc.) operable to generate a signal related to a load of the conveyors, etc.

The controller 500 includes combinations of hardware and software that are operable to, among other things, generate an output regarding the health of the longwall mining system 100, control the operation of the longwall mining system 100, activate the one or more indicators 520 (e.g., a liquid crystal display ["LCD"]), and monitor the operation of the longwall mining system 100. In some embodiments, the controller 500 includes a plurality of electrical and electronic components that provide power, operational control, and protection to the components and modules within the controller 500 and/or the longwall mining system 100. For example, the controller 500 includes, among other things, an electronic processor 580 (e.g., a microprocessor, a microcontroller, or another suitable programmable device), a memory 590, input units 502, and output units 504. The electronic processor 580 includes, among other things, a control unit 582, an arithmetic logic unit ("ALU") 584, and a plurality of registers 586, and is implemented using a known computer architecture, such as a modified Harvard architecture, a von Neumann architecture, etc. The electronic processor 580, the memory 590, the input units 502, and the output units 504, as well as various modules connected to the controller 500 are connected by one or more control and/or data buses (e.g., common bus 506). The control and/or data buses are shown generally in FIG. 5 for illustrative purposes. The use of one or more control and/or data buses for the interconnection between and communications among the various modules and components would be known to a person skilled in the art in view of the invention described herein. In some embodiments, the controller 500 is implemented partially or entirely on a semiconductor chip, is a field-programmable gate array ("FPGA"), is an application specific integrated circuit ("ASIC"), is a proportional-integral-derivative (PID) controller, etc.

The memory 590 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The electronic processor 580 is connected to the memory 590 and executes software instructions that are capable of being stored in a RAM of the memory 590 (e.g., during execution), a ROM of the memory 590 (e.g., on a generally permanent basis), or another non-transitory computer readable medium such as another memory or a disc. Software included in the implementation of the longwall mining system 100 can be stored in the memory 590 of the controller 500. The software includes, for example, firmware, one or more applications, program data, filters, rules, one or more program modules, and other executable instructions. The controller 500 is configured or operable to retrieve from memory and execute, among other things, instructions related to the control processes and methods described herein. In other constructions, the controller 500 includes additional, fewer, or different components.

The controller 500 determines the face alignment from position data received from the alignment detection device 410. In some embodiments, the controller 500 may also receive face creep information from the creep detection device 550. In some embodiments, the creep detection device 550 is similar to the detection device disclosed in the co-pending U.S. patent application Ser. No. 15/080,322, titled "LONGWALL SYSTEM CREEP DETECTION," the entire content of which is hereby incorporated by reference. Although the alignment detection device 410 and the creep detection device 550 are shown as two separate components, in other embodiments, a combined detection device may be used to detect both face creep and face alignment.

The roof support drive mechanism and drive 560 is controlled by control signals received from the controller 500 or another associated controller. Each powered roof support 120 is associated with a section of the armored face conveyor 130 and uses a hydraulic ram to advance that section of the armored face conveyor 130. By controlling the amount of movement of the hydraulic rams, the drive 560 can change the angle of advance of the armored face conveyor 130. In some embodiments, the controller 500 controls the drive 560 and the longwall mining system 100 autonomously using the detection devices 410, 550, the one or more sensors 540 and one or more stored programs or modules. In other embodiments, the controller 500 controls the drive 560 and the longwall mining system 100 based on a combination of manual inputs and automatic controls.

The user interface 510 provides an interface to receive user controls and to provide user feedback to control and monitor the longwall shearer 110, the conveyors 130, 140, 150, and/or the longwall mining system 100. For example, the user interface 510 is operably coupled to the controller 500 to control the speed of the longwall shearer 110, the speed of the conveyors 130, 140, 150, the speed of the drive 560, the amount of retreat between shearer cycles etc. The user interface 510 can include a combination of digital and analog input or output devices required to achieve a desired level of control and monitoring for the longwall mining system 100. For example, the user interface 510 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface 510 can also be configured or operable to display conditions or data associated with the longwall mining system 100 in real-time or substantially real-time. For example, the user interface 510 is configured or operable to display measured characteristics of the longwall mining system 100 (e.g., of the longwall shearer 110, the conveyors 130, 140, 150, etc.), the status of the longwall mining system 100, the amount of face creep of the longwall mining system 100, the face alignment of the longwall mining system 100 etc. In some implementations, the user interface 510 is controlled in conjunction with the one or more indicators 520 (e.g., LEDs) to provide visual indications of the status or conditions of the longwall mining system 100 including the face creep and face alignment.

Although a single controller is illustrated in FIG. 5, in other constructions, the controller 500 may be separated into a plurality of controllers. For example, the controller 500 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

As previously indicated, the detection device 410 provides position data indicative of the position of the longwall shearer 110 as it moves along the ore face 240. The controller 500 receives this position data from the detection device 410. The controller 500 then processes and analyzes the position data to determine the face alignment of the ore face 240 and the longwall mining system 100. In some embodiments, the controller 500 may take corrective measures to arrest and correct face alignment detected by the detection device 410. The method of determining and correcting face alignment of the longwall mining system 100 is described in more detail below with respect to FIGS. 6 and 7.

The processes 600 and 700 are associated with and described herein with respect to determining a face alignment of the longwall mining system 100 and controlling the movement of the longwall mining system 100 using the powered roof supports 120 based on the face alignment. Various steps described herein with respect to processes 600 and 700 are capable of being executed simultaneously, in parallel, or in an order that differs from the illustrated serial manner of execution. The processes 600 and 700 may also be capable of being executed using fewer steps than shown in the illustrated embodiment. Additionally, the controller 500 and the detection device 410 are operable to execute the processes 600 and 700 at the same time or in tandem with other processes.

Figure 6:
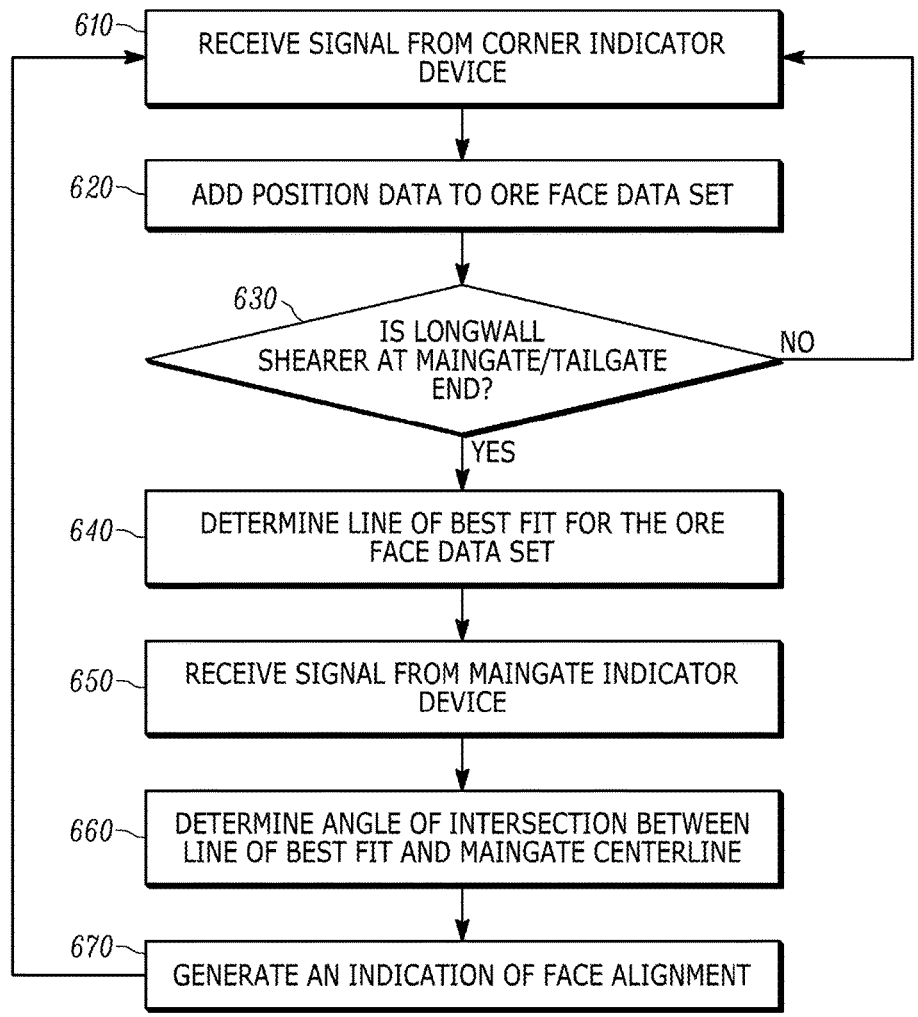
FIG. 6 illustrates a process for detecting face alignment of the longwall mining system of FIG. 1 according to one embodiment of the invention.

FIG. 6 illustrates a process 600 for determining face alignment of the longwall mining system 100. At step 610, the detection device 410 receives a signal indicating a position of the longwall shearer 110 from the corner indicator device 420. As described above, the detection device 410 may transmit a signal to the corner indicator device 420 and receive a reflected signal from the corner indicator device 420. The controller 500 electrically connected to the detection device 410 determines the position of the longwall shearer 110 based on the received signal from corner indicator device 420. The position may include both a distance measurement indicating the distance between the detection device 410 and the longwall shearer 110 and also a direction measurement indicating the direction at which the longwall shearer 110 is located relative to the detection device 410 (e.g., using an angle between 0-360 degrees with respect to a reference point internal to the detection device 410). In some embodiments, the position may include coordinates of the longwall shearer 110 using, for instance, rectangular coordinates where the x-axis extends in a general direction of travel of the longwall shearer 110 and the y-axis extends in the general direction of the maingate roadway 220. At step 620, the controller 500 adds position data indicating the position of the longwall shearer 110 determined in step 610 to an ore face data set. The ore face data set may be stored in the memory 590.

At step 630, the controller 500 determines whether the longwall shearer 110 has reached the maingate end 232 or tailgate end of the armored face conveyor 130. The controller determines that the longwall shearer 110 has reached either end (maingate/tailgate) of the armored face conveyor 130, for example, based on comparing the position of the longwall shearer 110 determined in step 610 with a predetermined maingate and tailgate position stored in the memory 590. In some embodiments, the controller 500 may determine that the longwall shearer 110 has reached either end based on data from other sensors (for example, sensors (540)) or system indicators. When the controller 500 determines that the longwall shearer 110 has not reached either end of the armored face conveyor 130, the process 600 loops back to step 610 to continuously determine the position of the longwall shearer 110 as it moves along the ore face 240. In some embodiments, the steps 610, 620, and 630 are executed at certain timed intervals such that, for example, the controller 500 determines the position of the longwall shearer 110 every one milli-second during a shearer cycle.

Steps 620 and 630 executed multiple times over the course of shearer cycle may be referred to collectively as a step of determining a shearer path for the longwall shearer 110. Accordingly, a determined shearer path includes the position of a longwall shearer 110 over time as the longwall shearer 110 travels from the maingate to the tailgate, or vice versa. The shearer path may be stored in the memory 590 and the controller 500 may graphically or numerically depict the shearer path. For example, FIG. 3 illustrates an exemplary shearer path 340 graphically, while a listing of the ore face data set would be a numerical depiction of the shearer path.

When the controller 500 determines that the longwall shearer 110 has reached either end (maingate/tailgate) or the armored face conveyor 130, in step 640, the controller 500 determines a line of best fit for the shearer path based on the position data obtained at step 610 and stored in the ore face data set at step 620. For example, FIG. 3 illustrates a line of best fit 330 for the shearer path 340. The controller 500 may use any known approximation techniques to determine the line of best fit 330 based on the position data stored in the ore face data set.

At step 650, the detection device 410 receives a signal from the maingate indicator device 430 indicating a position of the maingate centerline 320. As described above, the detection device 410 may transmit a signal to the one or more maingate indicator devices 430 and receive a reflected signal from the one or more maingate indicator device 430. The controller 500 coupled to the detection device 410 determines the position of the maingate centerline 320 based on the received signal from the maingate indicator device 430. In some embodiments, the detection device 410 may use the position of the detection device 410 to indicate a position of the maingate centerline 320 to the controller 500.

At step 660, the controller 500 determines an angle of intersection a between the line of best fit 330 determined in step 640 and the maingate centerline 320 determined in step 650. The controller 500 may use any known technique to determine the angle of intersection a. When the angle of intersection a is greater than 90° (i.e., the angle of intersection between the desired alignment line 310 and the maingate centerline 320), the controller 500 indicates that the face alignment is a maingate lead. When the angle of intersection a is smaller than 90°, the controller 500 indicates that the face alignment is a maingate lag. It should be understood that in embodiments where the desired alignment line 310 is not perpendicular to the maingate centerline 320, whether the face alignment is a maingate lead or a maingate lag is determined based on the angle of intersection between the desired alignment line 310 and the maingate centerline 320.

Steps 640, 650, and 660 may collectively be referred to as a step of determining face alignment of the longwall mining system 100 based on the shearer path.

At step 670, the controller 500 generates an indication of face alignment of the longwall mining system 100 based on the determined face alignment. This indication may be output on user interface 510, transmitted to a remote location, saved for plotting, etc. The indication may include one or more of a plot of the face alignment, an indication of maingate lead, an indication of maingate lag, the desired alignment line 310, the shearer path 340, the line of best fit 330, the maingate centerline 320, the angle of intersection a, a simulated projection of the longwall block 210, among other information, illustrated graphically, audibly, in text, and in other formats. The process 600 loops back to step 610 to continually determine face alignment for each subsequent layer of the longwall block 210.

Figure 7:
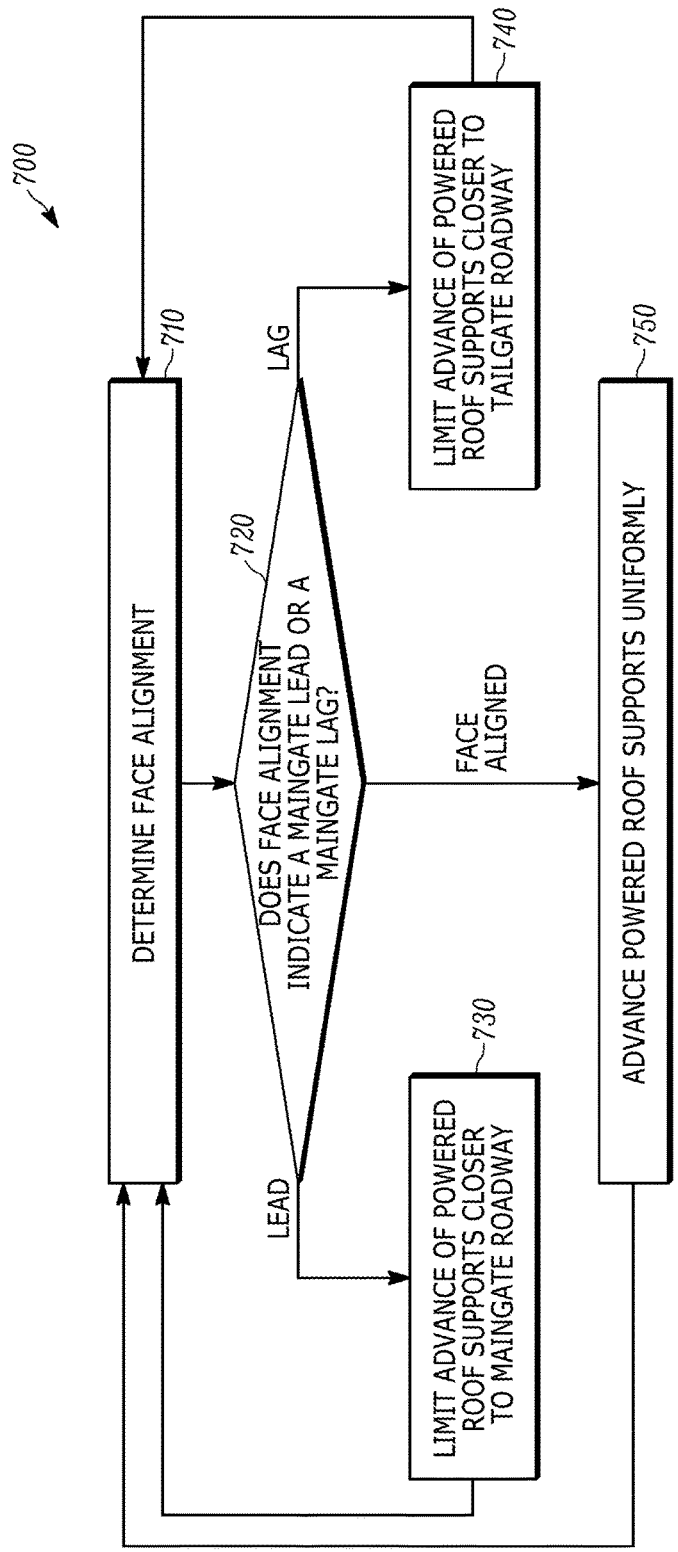
FIG. 7 illustrates a process for controlling the longwall mining system of FIG. 1 according to one embodiment of the invention.

FIG. 7 illustrates a process 700 of correcting a face alignment detected by control system 490. At step 710, the controller 500 determines the face alignment of the ore face 240. For example, step 710 may include executing the process 600 to generate the indication of face alignment. At step 720, the controller 500 determines whether the face alignment is a maingate lead, the face alignment is a maingate lag, or the face is aligned based on the indication of face alignment. As described above, the controller 500 determines that the face alignment is a maingate lead when the angle of intersection a between the line of best fit 330 and the maingate centerline 320 is greater than 90°. The controller 500 determines that the face alignment is a maingate lag when the angle of intersection a between the line of best fit 330 and the maingate centerline 320 is smaller than 90°. When the angle of intersection is at 90°, the face is aligned.

When the controller 500 determines that the face alignment is a maingate lead, the controller 500 controls the drive 560 to limit the advance of the powered roof supports 120 closer to the maingate roadway 220 (step 730). When the controller 500 determines that the face alignment is a maingate lag, the controller 500 controls the drive 560 to limit the advance of the powered roof supports 120 closer to the tailgate roadway 230 (step 740). When the controller 500 determines that the face is aligned, the controller 500 controls the drive 560 to advance the powered roof supports 120 uniformly without limiting advancement of the powered roof supports 120 at either end (step 750). The method of controlling the advance of powered roof supports 120 to correct the face alignment is described in more detail below with respect to FIGS. 8A and 8B.

The processes 600 and 700, described above, provide only some examples of determining face alignment of the ore face 240. Other methods, formulas and techniques are possible and contemplated by the present invention. Therefore, the methods, formulas and techniques described above are exemplary and not intended to be limiting.

In some embodiments, the electronic processor 580 of the controller 500 determines the face alignment using the position data received from the detection device 410. In some embodiments, the controller 500 is incorporated into the detection device 410. In other embodiments, an electronic processor may be included in the detection device 410 to determine the face alignment. An indication of face alignment is then communicated to the controller 500 from the detection device 410.

Figure 8A:
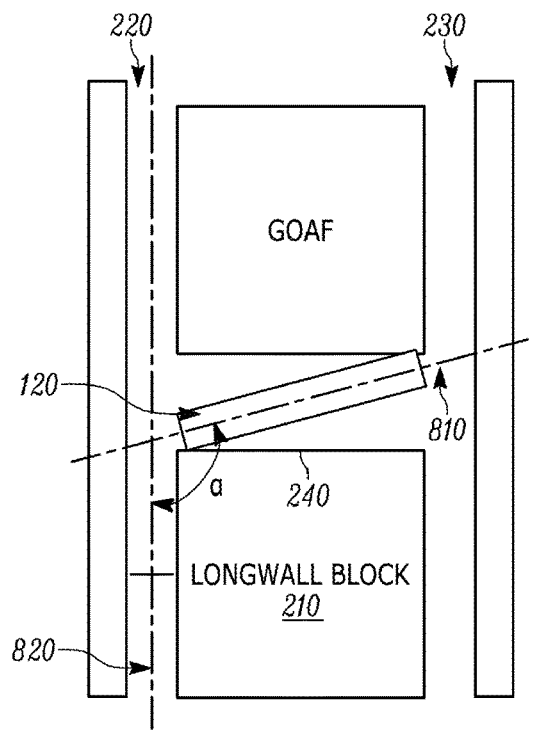
FIGS. 8A and 8B illustrate an arrangement of the longwall mining equipment to correct face alignment of the longwall mining system of FIG. 1.

FIG. 8A illustrates an example of correcting a maingate lead according to method 700 of FIG. 7. When the controller 500 determines that the longwall mining system 100 is in a maingate lead (step 720), the controller 500 controls the drive 560 to advance the powered roof supports 120, and thereby the armored face conveyor 130, such that the roof supports closer to the tailgate roadway 230 are advanced farther than the roof supports closer to the maingate roadway 220 (step 730). Accordingly, the powered roof supports 120 are advanced by the drive 560 such that the angle α between a best fit line 810 after the advance and the maingate centerline 820 is decreased. The controller 500 continues such an advance for each layer of the longwall block 210 until the face alignment determined by the controller 500 is neutral.

Figure 8B:
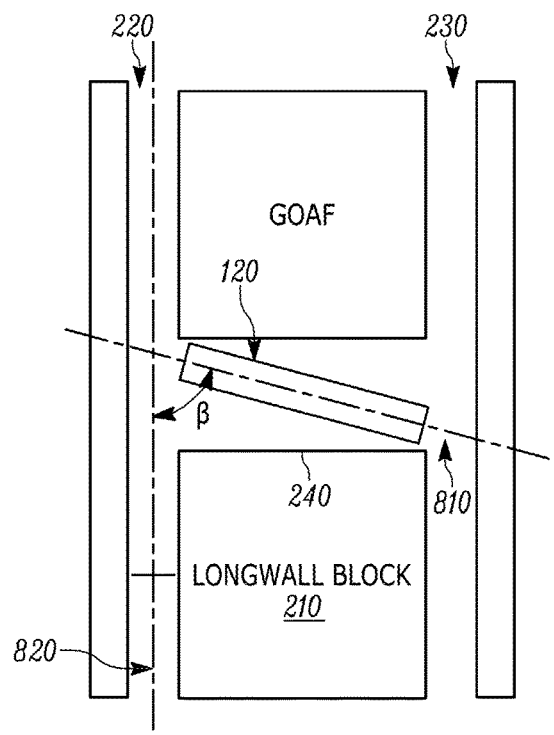

FIG. 8B illustrates an example of correcting a maingate lag according to method 700 of FIG. 7. When the controller 500 determines that the longwall mining system 100 is in a maingate lag (step 720), the controller 500 controls the drive 560 to advance the powered roof supports 120, and thereby the armored face conveyor 130, such that the roof supports closer to the maingate roadway 220 are advanced farther than the roof supports closer to the tailgate roadway 230 (step 740). Accordingly, the powered roof supports 120 are advanced by the drive 560 such that the angle β between a best fit line 810 after the advance and the maingate centerline 820 is increased. The controller 500 continues such an advance for each layer of the longwall block 210 until the face alignment determined by the controller 500 is neutral.

When the controller 500 determines that the face alignment is neutral, all roof supports may be advanced the same distance. Further, in some embodiments, the controller 500 may be programmed to correct the face alignment only when the amount of deviation from desired face alignment exceeds a pre-determined threshold. Additionally, the aggressiveness of the correction may be proportional to the amount of deviation from ideal face alignment detected.

In some embodiments, the controller 500 corrects face alignment based on a comparison of the shearer path 340 and the line of best fit 330. For each powered roof support 120, the controller 500 determines whether the corresponding position on the shearer path 340 indicates that the powered roof support 120 is closer to the ore face 240 than the line of best fit 330 (i.e., the position corresponding to the powered roof support 120 on the shearer path 340 lies between the line of best fit 330 and the ore face 240 in FIG. 3) or that the powered roof support 120 is farther from the ore face 240 than the line of best fit 330. When the controller 500 determines that the powered roof support 120 is closer to the ore face 240 than the line of best fit 330, the controller 500 may limit the advance of the powered roof support 120. When the controller 500 determines that the powered roof support 120 is farther from the ore face 240 than the line of best fit 330, the controller 500 may advance the powered roof support 120 by more than other powered roof supports at or closer to the ore face 240. For example, the powered roof supports 120 farther from the ore face 240 than the line of best fit 330 may be advanced by the distance between the shearer path 340 and the line of best fit 330 at the position of the powered roof support 120.

The described techniques are used to auto steer the ore face 240 by initiating a maingate or tailgate lead or lag, at a severity required to arrest and correct a creeping face and auto correct face misalignment by limiting powered roof supports 120 advance by measured amounts at relevant points along the longwall.

Thus, the invention may generally provide, among other things, systems and methods for detecting a face alignment of a longwall mining system and steering the longwall mining system.

What is claimed is:

1. A system for detecting face alignment of a longwall mining system, the system comprising:
   a detection device mounted in a maingate roadway;
   a first indicator device mounted on a shearer of the longwall mining system to indicate a position of the shearer to the detection device; and
   a controller coupled to the detection device configured to:
      determine a shearer path of the shearer as the shearer moves along an ore face, the shearer path being determined based on a signal from the first indicator device received by the detection device, and
      generate an indication of face alignment based on the shearer path by
         determining a line of best fit for the shearer path; and
         determining an angle of intersection between the line of best fit and a maingate line extending along the maingate roadway.

2. The system of claim 1, further comprising:
   a second indicator device mounted in the maingate roadway to indicate a position of the maingate line to the detection device, and
   wherein the controller is further configured to determine the position of the maingate line based on the second indicator device.

3. The system of claim 1, wherein the controller is further configured to:
 determine that a powered roof support has advanced farther than the line of best fit; and
 limit an advance of the powered roof support based on determining that the powered roof support advanced farther than the line of best fit.

4. The system of claim 1, wherein the controller is further configured to:
 determine whether the indication of face alignment indicates one from the group consisting of a maingate lead and a maingate lag;
 when the indication of face alignment indicates a maingate lead, advance powered roof supports such that an angle of advance is less than 90° from the maingate line; and
 when the indication of face alignment indicates a maingate lag, advance the powered roof supports such that the angle of advance is greater than 90° from the maingate line.

5. The system of claim 1, further comprising a user interface coupled to the controller, wherein the controller is further configured to display the shearer path and the line of best fit on the user interface of the longwall mining system.

6. The system of claim 1, wherein the detection device advances along the maingate roadway as the longwall mining system advances.

7. A method for detecting face alignment of a longwall mining system, the method comprising:
 receiving, by a detection device, a signal from a first indicator device on a shearer that is indicative of a position of the shearer of the longwall mining system;
 determining, by a controller coupled to the detection device, a shearer path of the shearer along an ore face, the shearer path being determined based on the signal received by the detection device; and
 generating, by the controller, an indication of face alignment based on the shearer path;
 wherein generating an indication of face alignment further comprises:
  determining a line of best fit for the shearer path; and
  determining an angle of intersection between the line of best fit and a maingate line extending along a maingate roadway.

8. The method of claim 7, further comprising:
receiving, by the detection device, a signal from a second indicator device indicative of a position of the maingate line; and
determining, by the controller, the position of the maingate line based on the signal from the second indicator device.

9. The method of claim 7, further comprising:
determining, by the controller, that a powered roof support has advanced farther than the line of best fit; and
limiting, by the controller, an advance of the powered roof support based on determining that the powered roof support advanced farther than the line of best fit.

10. The method of claim 7, further comprising displaying the shearer path and the line of best fit on a user interface of the longwall mining system.

11. The method of claim 7, further comprising:
determining, by the controller, whether the indication of face alignment indicates one from the group consisting of a maingate lead and a maingate lag;
 when the indication of face alignment indicates a maingate lead, advancing, by the controller, powered roof supports such that an angle of advance is less than 90° from the maingate line; and
 when the indication of face alignment indicates a maingate lag, advancing, by the controller, the powered roof supports such that the angle of advance is greater than 90° from the maingate line.

12. A controller for detecting face alignment of a longwall mining system, the controller comprising an electronic processor and executable instructions stored in a memory configured to:
 determine a shearer path of a shearer along an ore face, the shearer path being determined based on a signal, from a first indicator device on the shearer, that is received by a detection device coupled to the controller and located in a maingate roadway; and
 generate an indication of face alignment based on the shearer path by:
  determining a line of best fit for the shearer path, and
  determining an angle of intersection between the line of best fit and a maingate line extending along the maingate roadway.

13. The controller of claim 12, further comprising executable instructions stored in a memory configured to determine the position of the maingate line based on a signal from a second indicator device in the maingate roadway that is received by the detection device.

14. The controller of claim 12, further comprising executable instructions stored in a memory configured to:
 determine that a powered roof support has advanced farther than the line of best fit; and
 limit an advance of the powered roof support based on determining that the powered roof support advanced farther than the line of best fit.

15. The controller of claim 12, further comprising executable instructions stored in a memory configured to:
 determine whether the indication of face alignment indicates one from the group consisting of a maingate lead and a maingate lag;
 when the indication of face alignment indicates a maingate lead, advance powered roof supports such that an angle of advance is less than 90° from the maingate line; and
 when the indication of face alignment indicates a maingate lag, advance the powered roof supports such that the angle of advance is greater than 90° from the maingate line.

16. The controller of claim 12, further comprising executable instructions stored in a memory configured to display, on a user interface coupled to the controller, the shearer path and the line of best fit.

17. The controller of claim 12, wherein the indication of face alignment indicates:
 maingate lead when the angle of intersection between the line of best fit and the maingate line is greater than 90 degrees, and
 maingate lag when the angle of intersection between the line of best fit and the maingate line is less than 90 degrees.

* * * * *